(12) United States Patent
Rice (10) Patent No.: US 8,076,629 B2
(45) Date of Patent: Dec. 13, 2011

(54) PHOTOPUMPED SEMICONDUCTOR IMAGE AMPLIFIER COMPRISING A WAVEGUIDE WITH EMBEDDED QUANTUM WELLS AND AN OPTICAL NARROW BANDPASS FILTER

(75) Inventor: Robert Rex Rice, Simi Valley, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 300 days.

(21) Appl. No.: 12/148,970

(22) Filed: Apr. 24, 2008

(65) Prior Publication Data

US 2009/0268069 A1 Oct. 29, 2009

(51) Int. Cl.
*H01J 5/16* (2006.01)
*H01L 27/00* (2006.01)
(52) U.S. Cl. ............... 250/216; 250/208.1; 250/226
(58) Field of Classification Search ............. 250/214 LA, 250/214 A, 208.1, 207, 216, 226, 214 VT; 359/344, 342, 337, 337.1, 345, 341.1, 341.32, 359/341.5, 333; 257/14; 348/707; 330/147, 330/144, 145, 125, 56, 308, 286, 287, 5.5
See application file for complete search history.

(56) References Cited

U.S. PATENT DOCUMENTS

| | | | | | |
|---|---|---|---|---|---|
| 3,626,312 | A | * | 12/1971 | Snitzer | 359/341.1 |
| 6,104,739 | A | * | 8/2000 | Hong et al. | 372/50.11 |
| 6,445,491 | B2 | * | 9/2002 | Sucha et al. | 359/330 |
| 6,624,925 | B2 | * | 9/2003 | Hasson et al. | 359/333 |
| 7,193,771 | B1 | * | 3/2007 | Smith et al. | 359/333 |

\* cited by examiner

*Primary Examiner* — Que T Le
*Assistant Examiner* — Jennifer Bennett
(74) *Attorney, Agent, or Firm* — Carmen Patti Law Group, LLC (57) ABSTRACT

One embodiment is an optical image preamplifier having an input through which a laser signal is received and amplified, said laser signal emanating from a target illuminated by a laser transmitter or generated by multiple lasercom transmitters in the field of view; the optical image preamplifier also having an output; and a focal plane array having an input operatively coupled to the output of the optical preamplifier. Embodiments of the present method and apparatus may be utilized to overcome photodetector and post-detection electronic noise to permit near quantum-limited receiver sensitivity with simple focal plane technologies. These embodiments enable ladar, wavefront sensor and multiple access lasercom systems that provide high sensitivity with the wide bandwidth and wavelength flexibility of semiconductor laser media.

18 Claims, 6 Drawing Sheets

PHOTOPUMPED SEMICONDUCTOR IMAGE AMPLIFIER COMPRISING A WAVEGUIDE WITH EMBEDDED QUANTUM WELLS AND AN OPTICAL NARROW BANDPASS FILTER

TECHNICAL FIELD

The invention relates generally to waveguide amplifiers and, more particularly, to optical preamplification of an entire image prior to delivery to a focal plane array of a photopumped semiconductor image amplifier.

BACKGROUND

Ladar (Laser Detection and Ranging) is an optical remote sensing technology that measures properties of scattered light to find range and/or other information of a distant target. The sensitivity of focal plane arrays (FPAs) used for ladar and multiple-access lasercom is not sufficient in many instances, so gain is frequently employed to increase the signal level from the FPA. Internal gain, for example as occurs in avalanche photo detectors (APDs), improves sensitivity, but complicates FPA design and signal readout. The use of an external optical image preamplifier to raise the signal above the noise level of the detector array and post-detection electronics can significantly improve system performance; however, image amplifier technology has not generally been adequate for this application. The use of a photopumped semiconductor waveguide amplifier gain medium overcomes many issues with prior art image amplifiers.

SUMMARY

One embodiment of the present method and apparatus encompasses an apparatus. The apparatus may comprise: an optical image preamplifier having an input through which a back scatter signal from a target is received and amplified, the optical image preamplifier also having an output, and the optical image preamplifier being photopumped; and a focal plane array having an input operatively coupled to the output of the optical image preamplifier.

Another embodiment of the present method and apparatus encompasses an apparatus. The apparatus may comprise: a target illuminated with laser illumination that produces a weak back scatter signal of the target; an optical preamplifier having an input through which a back scatter signal is received and amplified, the optical image preamplifier being a photopumped semiconductor image amplifier having an output; a focal plane array having an input operatively coupled to the output of the optical image preamplifier; relay optics and a narrow band filter disposed between the optical image preamplifier and the focal plane array; wherein an entire image is optically preamplified prior to delivery to the focal plane array.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

In general the embodiments of the present method and apparatus may be referred to as an optical image preamplifier, an optical preamplifier, an image preamplifier or a photopumped semiconductor preamplifier. A photopumped semiconductor image preamplifier may be considered a particular version of an image preamplifier, which is in turn a member of the class of optical preamplifiers. The function of an image preamplifier is to boost the power level of the image to overcome noise in the detector array and post-detection electronics; this is what the use of heterodyne mixing is intended to accomplish, but heterodyne mixing is very difficult for amplifying an image because the wavefronts must be precisely matched at the array pixels. A preamplifier is far simpler since no wavefront alignment is required.

Optical preamplification is an attractive method of increasing ladar return signals, but the added optical noise minimizes the benefit obtained from the gain of the optical amplifier. By combining an optical amplifier with a narrowband optical bandpass filter, spontaneous emission noise added by the amplifier is partially rejected, allowing the gain from the amplifier to be realized as an increase in sensitivity. Spontaneously emission noise cannot be totally rejected, hence leading to a theoretical noise figure of at least 3 db.

A purpose of the optical image preamplifier is to enable comparable sensitivity without the use of a heterodyne mixing. Heterodyne mixing can also overcome noise in the detector and post-detection electronics, but requires near perfect wavefront matching (i.e., is exquisitely sensitive to phase variations across the input wavefront) and just does not work with an image, the wavefront of which contains drastic phase variations by nature. Additionally, an optical preamplifier can compensate for low quantum efficiency (QE) of the photodetector array to avoid degradation of the signal-to-noise ratio (SNR), a benefit that is not accomplished by other methods cited earlier such as internal avalanche gain or heterodyne detection.

Figure 1:
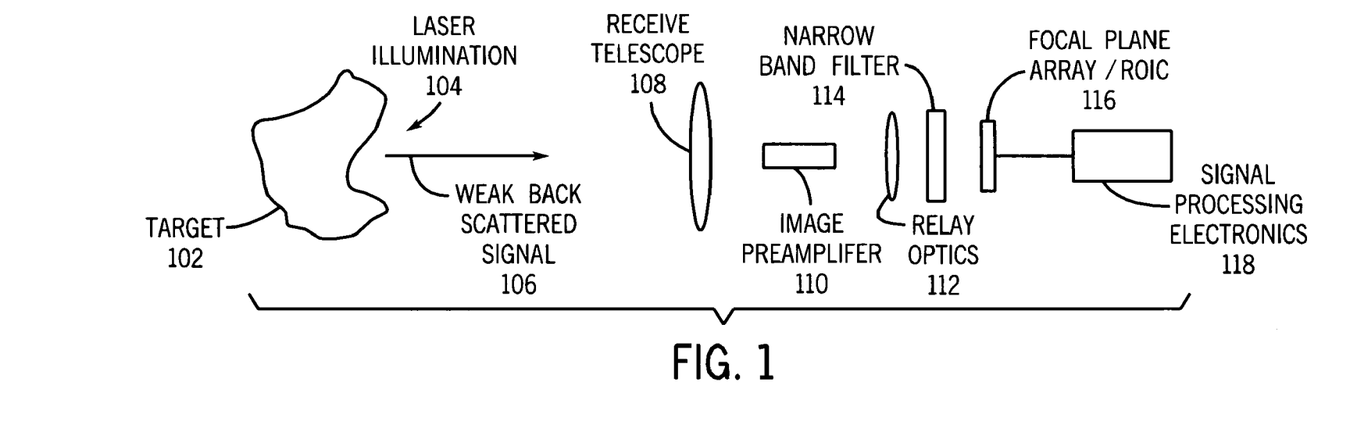
FIG. 1 depicts an embodiment according to the present method and apparatus.

FIG. 1 depicts an embodiment according to the present method and apparatus. In this embodiment a target 102 is illuminated by laser illumination 104 and a weak back scattered signal 106 is directed to a receive telescope 108. Following the receive telescope 108, is an image preamplifier 110, relay optics 112, narrow band filter 114, focal plane array/receiver optical integrated circuit (ROIC) 116 and signal processing electronics 118.

Embodiments of the present method and apparatus preamplify images in a photopumped waveguide to enhance sensitivity of optical receivers. As a result gains of 30 dB and NF of 3 dB are feasible. There is good image quality with high MTF. Either continuous waves or short pulses may be used for pumping, the gain following pump intensity. The wavelength of operation supports ladar systems using, for example Nd:YAG, Yb fibers, and Er fibers, and the optical gain may be temporal waveform controlled by pump to enable range gating.

Embodiments of the present method and apparatus reduce ladar transmitter power and aperture, and enable a wider choice of FPA (focal plane array) technologies. By raising the signal above the receiver noise, embodiments of the present method and apparatus reduces cost of ladar systems, enable multiple access lasercom receivers, and enhance wavefront sensors for AO. There are many benefits of the embodiments of the present method and apparatus. Prior art optical preamplifiers using fibers did not provide high gain and low noise with excellent imaging properties, but photopumping a multimode semiconductor waveguide amplifier enables efficient image amplification without serious image degradation nor excessive additive noise. Some of the benefits are: high gain (~30 dB); low noise figure (NF~3 dB); face pumping by simple low power diode bars; large gain bandwidth (30-50 nm); supports CW, wideband data, short pulses, chirped or other coherent waveforms; wide operating wavelength range (750-2000 nm) can cover important ladar and lasercom wavelengths; fabricated by established epitaxial growth and wafer processing; pulsed pumping permits range gated operation; and avoids problems inherent in electrical pumping.

Embodiments of the present method and apparatus permit high sensitivity receiver operation using simple and low cost detector arrays. For example, embodiments may include: PIN photodiodes rather than GM APDs; resolvable spots and MTF determined by waveguide dimensions (large numerical aperture); and CW or pulsed operation (gain follows pump intensity). Embodiments of the present method and apparatus may extend to MWIR, which may be feasible using appropriate semiconductor materials and cryogenic cooling.

Figure 2:
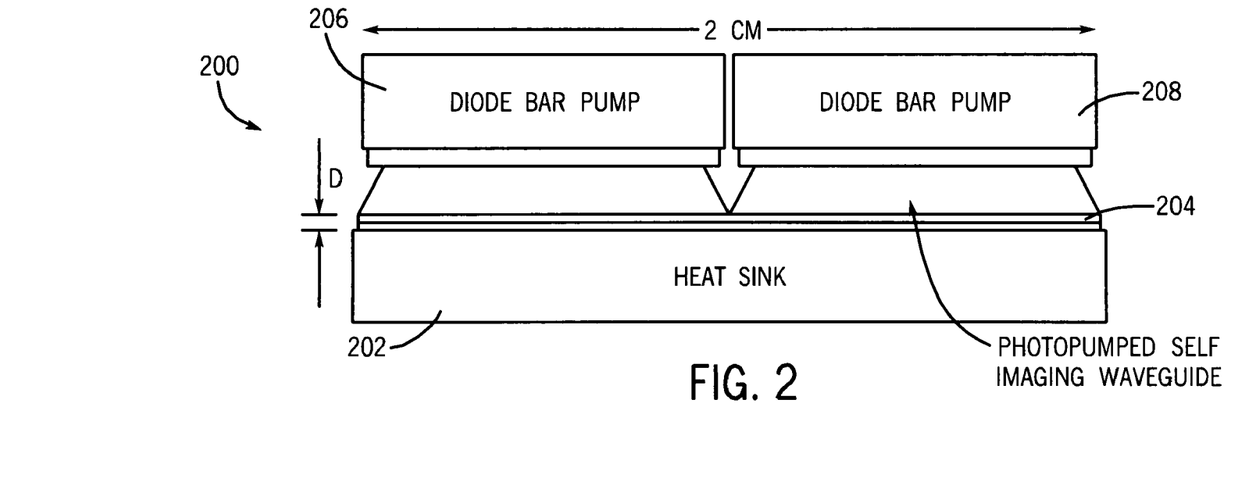
FIG. 2 depicts an embodiment according to the present method and apparatus of an optical image preamplifier.

FIG. 2 depicts an embodiment according to the present method and apparatus of an image preamplifier 200. In this embodiment a photopumped self imaging waveguide 204 is located on a heat sink 202. Located above the photopumped self imaging waveguide 204 are diode bar pumps 206, 208.

Figure 3:
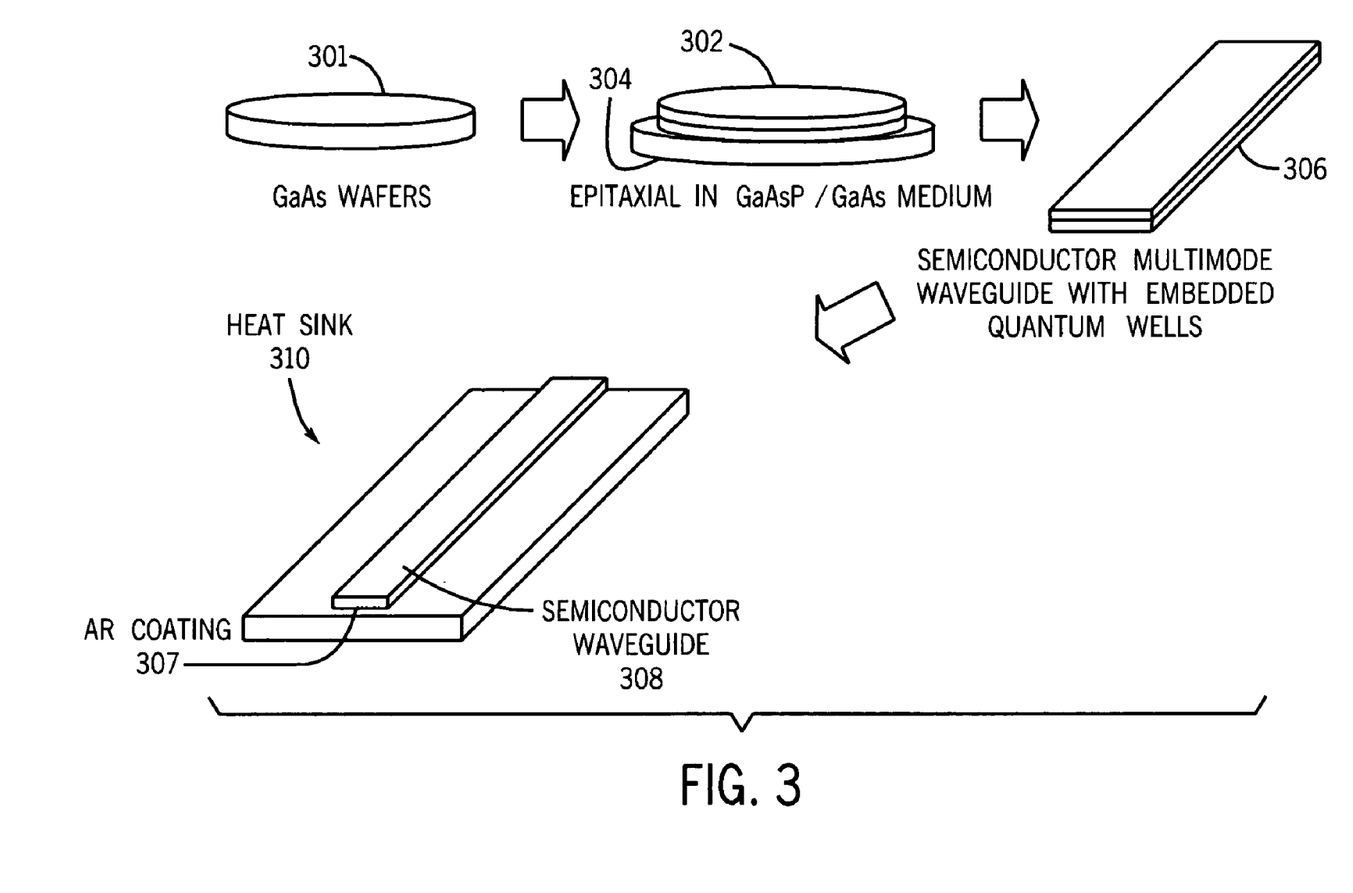
FIG. 3 depicts a semiconductor waveguide fabrication process according to the present method and apparatus.

FIG. 3 depicts a semiconductor waveguide fabrication process according to the present method and apparatus. As an example, fabrication and processing may be performed with a GaAs wafer 301. Epitaxial layers 302 may be grown on large, for example, 3 or 4 inch substrates 304 to form a semiconductor multimode waveguide 306 with quantum wells using quaternary alloys to control band gap and lattice constant. Wafers may be lapped to desired thickness from the substrate side, AR 307 coated and bonded to heat sinks to produce a waveguide 308 with a heat sink 310.

Figure 4:
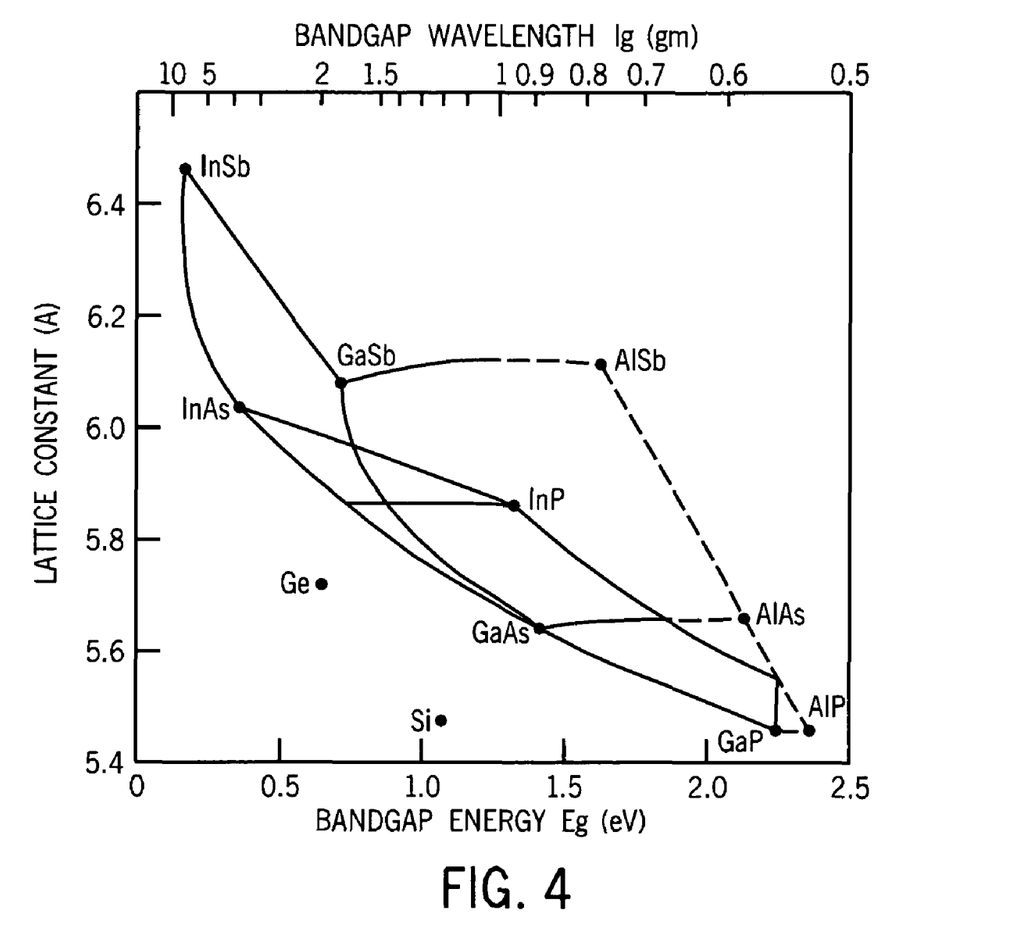
FIG. 4 is a graph depicting lattice constant versus band gap energy.

FIG. 4 is a graph depicting lattice constant versus band gap energy. Quantum wells may have both band gap and lattice constant mutually controlled. Quaternary III-V alloys (e.g. GaInAsSb, etc.) may be used. The quantum well thickness also modifies wavelength. FIG. 4 is a three dimensional representation of the thermal resistivity for $In_{1-x}$, $Ga_x$, $As_y$, $P_{1-y}$ quaternary alloy over the entire range of compositions. Thus, the quantum well amplifier may operate with a highly uniform temperature distribution.

Figure 5:
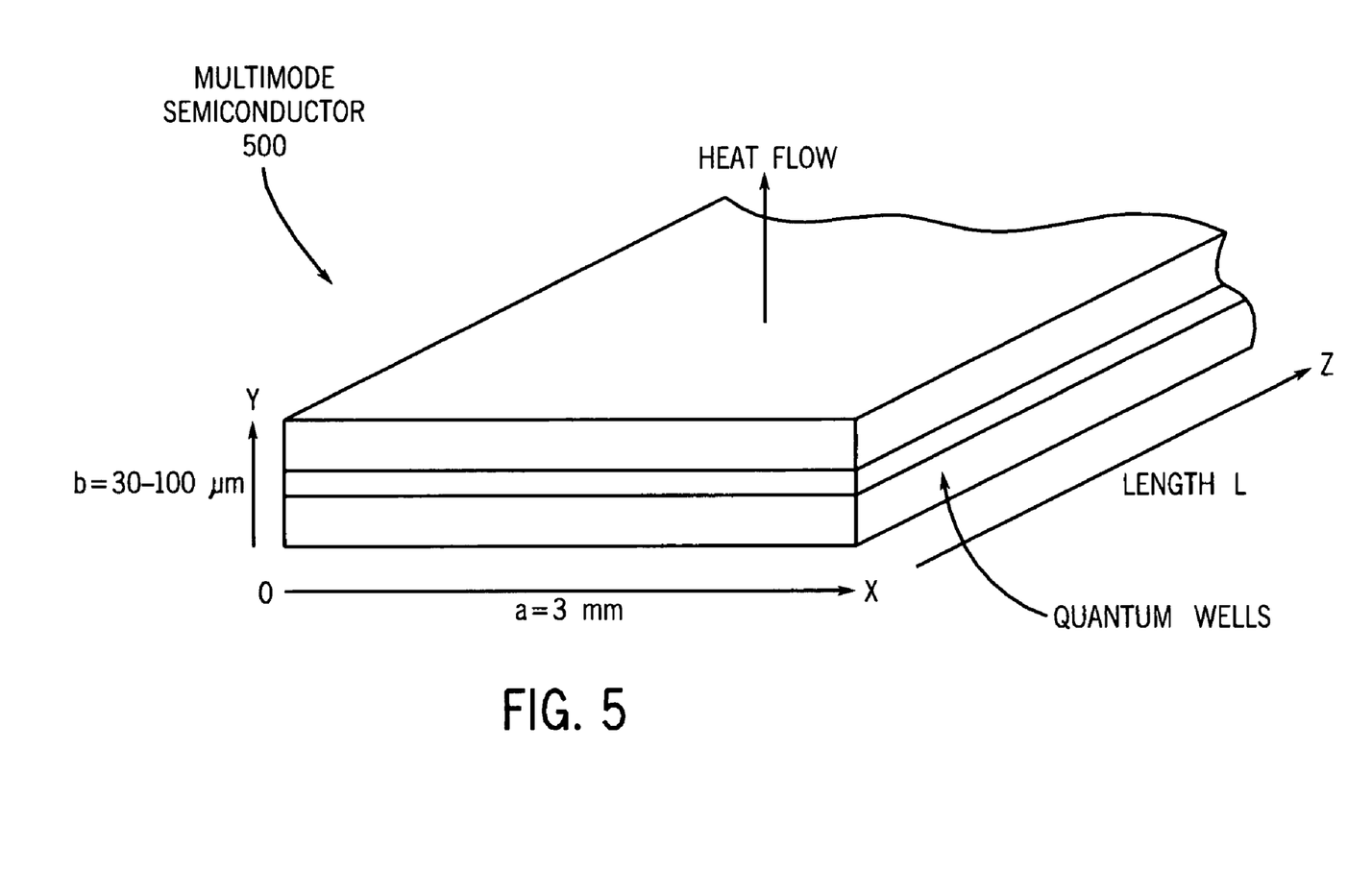
FIG. 5 shows an example of one embodiment of a multimode semiconductor waveguide.

FIG. 5 shows an example of one embodiment of a multimode semiconductor waveguide 500. For an amplifier of thickness b with N quantum wells of thickness $t_w$, an overlap factor T may be calculated as $T=Nt_w/b$. The net gain (G=exp (gTL)) depends on the gain coefficient g for each well and the length L of the amplifier. Quantum well gain may depend on carrier density in a complex way, but can be large (e.g., 100-1000 $cm^{-1}$). Carrier density may also depend on pump intensity and amplifier power in a complex way. Features may be a large area semiconductor waveguide, high index contrast, and high order multimode design. Waveguide modes (ignoring quantum wells) may be:

$$\phi_{ij} = \sqrt{\frac{4Z}{ab}} \operatorname{Sin}\left(\frac{i\pi x}{a}\right)\operatorname{Sin}\left(\frac{j\pi y}{b}\right), 0 < x < a \text{ and } 0 < y < b$$

$i,j = 1, 2, 3, \ldots, n$ Eigen function normalized to unit power

Signal along length L of amplifier may be calculated as function of pumping and input field distribution to determine image signal gain. The heat flow within the waveguide may be determined to obtain the operating temperature distribution, which is anticipated to be small and constant in time. Amplifier may be designed for Talbot self-imaging length (i.e., $L=4nd2/\lambda$) for the operating wavelength.

Figure 6:
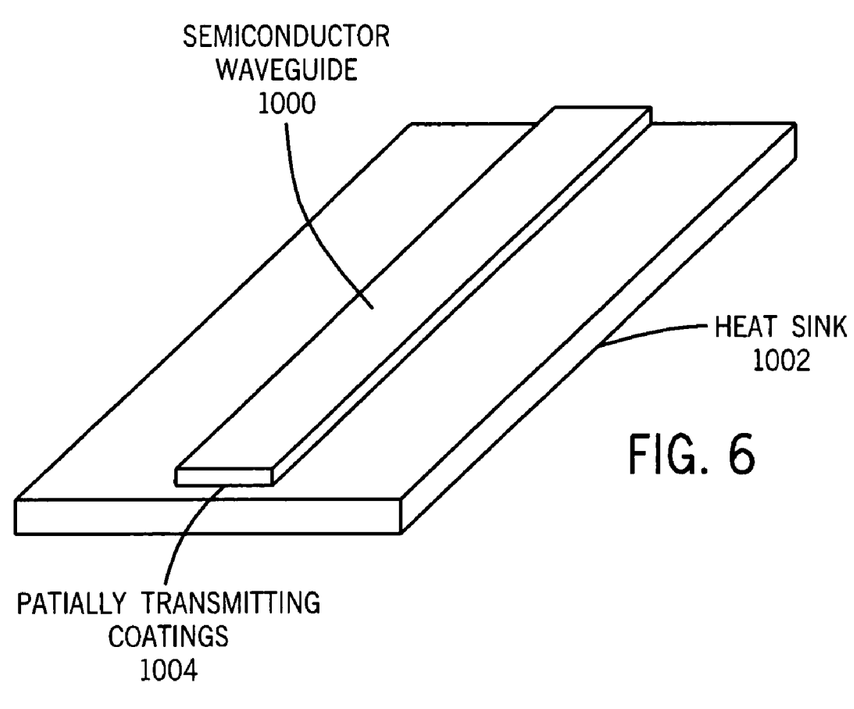
FIG. 6 depicts a semiconductor waveguide 1000 having a heat sink 1002 with partially transmitting coatings 1004 to provide optical feedback.
Figure 7:
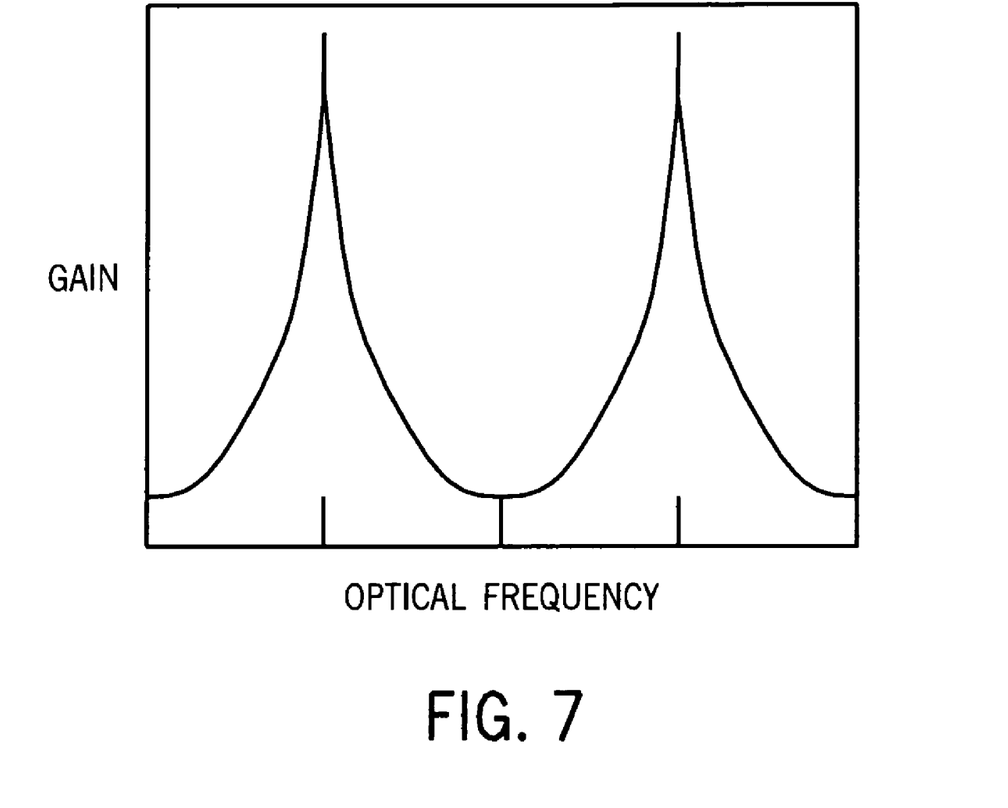
FIG. 7 is a graph showing gain v. optical frequency for an amplifier with partially transmitting coatings.

FIG. 6 depicts a semiconductor waveguide 1000 having a heat sink 1002 with partially transmitting coatings 1004, and FIG. 7 is a graph showing gain v. optical frequency. By using a partially transmitting coating in place of an antireflection coating, the self-imaging waveguide amplifier exhibits resonant behavior. The gain becomes periodic ($\Delta v=c/2nL$) with signal wavelength, and the peak gain may be increased by finesse (Q) of resonator. Also, the required pump power is reduced for a given gain, and ASE and spectral background are suppressed. However, gain may not be increased arbitrarily or parasitic oscillation could occur.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

The following are anachronisms used in the present specification:
Ladar (Laser Detection and Ranging)
FPA (focal plane array)
FPA (Focal Plane Array)
APD (Avalanche Photo Detector)
QE (Quantum Efficiency)
SNR (Signal-to-Noise Ratio)
ROTC (Receiver Optical Integrated Circuit)
MIT (Modulation Transfer Function)
Nd:YAG (Neodymium-doped Yttrium Aluminium Garnet)
Yb (Ytterbium)
Er (Erbium)
AO (Adaptive Optics)
NF (Noise Figure)
CW (Continuous Wave)
PIN (P-type, Intrinsic, N-type)
APD (Avalanche Photo Detector)
MWIR (Medium Wavelength InfraRed)
AR (Anti-Reflective)
ASE (Amplified Spontaneous Emission)
Talbot self-imaging (spatial self-imaging)
$I_{1-x}$ (indium)
$Ga_x$ (Gallium)
$P_{1-y}$ (Phosphorus)
GaAs (Gallium Arsenide)
GaInAsSb (Gallium Indium Arsinide Antimonide)
GaAlAs (Gallium Aluminum Arsenide)
GaInAs (Gallium Indium Arsenide)
GaInAsP (Gallium Indium Arsenide Phosphide)
GaAsP (Gallium Indium Phosphide)

GaSb (Gallium Antimonide)
InP (Indium Phosphide)
InSb (Indium Antimonid)

I claim:

1. Image preamplifier apparatus wherein an entire image can be amplified with high fidelity and low additive noise prior to delivery to a focal plane array, comprising:
   a photopumped semiconductor active amplifier wherein a medium of said amplifier comprises a thick multimode semiconductor waveguide with embedded quantum wells which utilize Talbot self-imaging; and
   a narrowband optical bandpass filter operatively coupled to the photopumped semiconductor active amplifier;
   the photopumped semiconductor active amplifier and the narrowband optical bandpass filter configured such that spontaneous emission noise added by the photopumped semiconductor active amplifier is partially rejected, allowing a gain to be realized as an increase in sensitivity.

2. The image preamplifier apparatus according to claim 1, wherein the medium of the semiconductor active amplifier is fabricated by epitaxial growth of layers on a semiconductor substrate, said layers including multiple periods of thin quantum wells separated by barrier layers of a different and lower refractive index.

3. The image preamplifier apparatus according to claim 1, wherein the waveguide of the semiconductor active amplifier further comprises a plurality of diode bar pumps operatively coupled to the photopumped waveguide, and wherein the semiconductor active amplifier has a partially transmitting optical coating that provides selective and resonant optical gain to reject optical background, reduce ASE (Amplified Spontaneous Emission) and minimize pumping power.

4. The image preamplifier apparatus according to claim 1, wherein the photopumped semiconductor waveguide has its length, L, in a specific relationship to its thickness, d, refractive index, n, and operating signal wavelength, $\lambda$, ($L=4nd^2/\lambda$) so as to assure Talbot self-imaging and produce an output image that faithfully replicates the input image with optical gain, and wherein the image preamplifier apparatus has a high gain of approximately 30 dB, a near quantum-limited low noise figure of approximately 3 dB.

5. The image preamplifier apparatus according to claim 1, wherein the image preamplifier apparatus provides:
   a large gain bandwidth of approximately 30-50 nm;
   a wide operating wavelength range of approximately 750-2000 nm as determined by semiconductor composition; and
   an extension to even longer operating wavelengths with cryogenic cooling.

6. The image preamplifier apparatus according to claim 2, wherein the semiconductor materials used in the quantum wells and barrier layers is:
   selected from the III-V semiconductor alloy system including GaAs, GaAlAs, GaInAs, GaInAsP, InP, GaAsP, InSb, GaSb, and others.

7. The image preamplifier apparatus according to claim 1, wherein the photopumped semiconductor active amplifier is fabricated by:
   cutting or cleaving the waveguide to a length from a grown wafer to achieve self-imaging at a design operating wavelength;
   applying an optical coating, which is an anti-reflection AR coating, to the waveguide; and
   bonding the waveguide to a heat sink for dissipation of heat produced by optical pumping.

8. The image preamplifier apparatus according to claim 1, wherein the image preamplifier provides selectable pumping modes including continuous pumping to accomplish amplification of continuous back scatter signals, and short pulse pumping to permit a gated amplifier response to enable range gating of a back scatter signal.

9. An apparatus, comprising: a target illuminated with laser illumination that produces a back scatter signal; a receive telescope for collecting the back scatter signal and delivering it to the optical image preamplifier; an optical image preamplifier comprising: an input through which the back scatter signal is received and amplified, a photopumped semiconductor active amplifier wherein a medium of said amplifier comprises a thick multimode semiconductor waveguide with embedded quantum wells which utilize Talbot self-imaging; a narrowband optical bandpass filter operatively coupled to the photopumped semiconductor active amplifier, the photopumped semiconductor active amplifier and the narrowband optical bandpass filter configured such that spontaneous emission noise added by the photopumped semiconductor active amplifier is partially rejected, allowing a gain to be realized as an increase in sensitivity; and an output; and a focal plane array having an input operatively coupled to the output of the optical image preamplifier through relay optics; wherein an entire image is optically preamplified prior to delivery to the focal plane array.

10. The apparatus according to claim 9, wherein the receive telescope receives the back scatter signal from the laser before it is received by the optical image amplifier and delivers it to the input of the optical image amplifier.

11. The apparatus according to claim 9, wherein the focal plane array/ROIC assembly comprises:
   an M×N array of wideband photodetector elements optimally responsive at the back scatter signal wavelength;
   a Receiver Optical Integrated Circuit (ROTC) interfaced with said M×N photodetector array; and
   a post-detection electronics module for signal processing.

12. An apparatus, comprising: an optical image preamplifier comprising: an input through which a back scatter signal is received and amplified, a photopumped semiconductor active amplifier wherein a medium of said amplifier comprises a thick multimode semiconductor waveguide with embedded quantum wells which utilize Talbot self-imaging; a narrowband optical bandpass filter operatively coupled to the photopumped semiconductor active amplifier, the photopumped semiconductor active amplifier and the narrowband optical bandpass filter configured such that spontaneous emission noise added by the photopumped semiconductor active amplifier is partially rejected, allowing a gain to be realized as an increase in sensitivity; and an output; a focal plane array having an input operatively coupled to the output of the optical image preamplifier through relay optics; wherein an entire image is optically preamplified prior to delivery to the focal plane array.

13. The apparatus according to claim 12, wherein the optical image preamplifier is combined with a polarization optical mixer.

14. The apparatus according to claim 12, wherein the optical image preamplifier comprises a photopumped self imaging waveguide located on a heat sink, and a plurality of diode bar pumps operatively coupled to the photopumped self imaging waveguide.

15. The apparatus according to claim 12, wherein receiver telescope receives the back scattered signal before being received by the optical image preamplifier.

16. The apparatus according to claim 12, wherein the apparatus provides optical preamplification of an entire image prior to delivery to the focal plane array.

17. The apparatus according to claim 12, wherein the optical image preamplifier uses one of continuous waves and short pulses.

18. The apparatus according to claim 12, wherein the apparatus has a high gain of approximately 30 dB, a low noise figure of approximately 3 dB, a large gain bandwidth of approximately 30-50 nm, and a wide wavelength range of approximately 750-2000 nm.

* * * * *